No. 891,934. PATENTED JUNE 30, 1908.
R. HUFF.
TRANSMISSION GEAR FOR MOTOR VEHICLES.
APPLICATION FILED FEB. 16, 1907.

Witnesses
Inventor
Russell Huff
Attorneys

UNITED STATES PATENT OFFICE.

RUSSELL HUFF, OF DETROIT, MICHIGAN, ASSIGNOR TO PACKARD MOTOR CAR COMPANY, OF DETROIT, MICHIGAN, A CORPORATION OF WEST VIRGINIA.

TRANSMISSION-GEAR FOR MOTOR-VEHICLES.

No. 891,934.　　　　　Specification of Letters Patent.　　　Patented June 30, 1908.

Application filed February 16, 1907. Serial No. 357,722.

*To all whom it may concern:*

Be it known that I, RUSSELL HUFF, a citizen of the United States, and resident of Detroit, Wayne county, State of Michigan, have invented certain new and useful Improvements in Transmission-Gear for Motor-Vehicles, of which the following is a specification.

Figure 1:
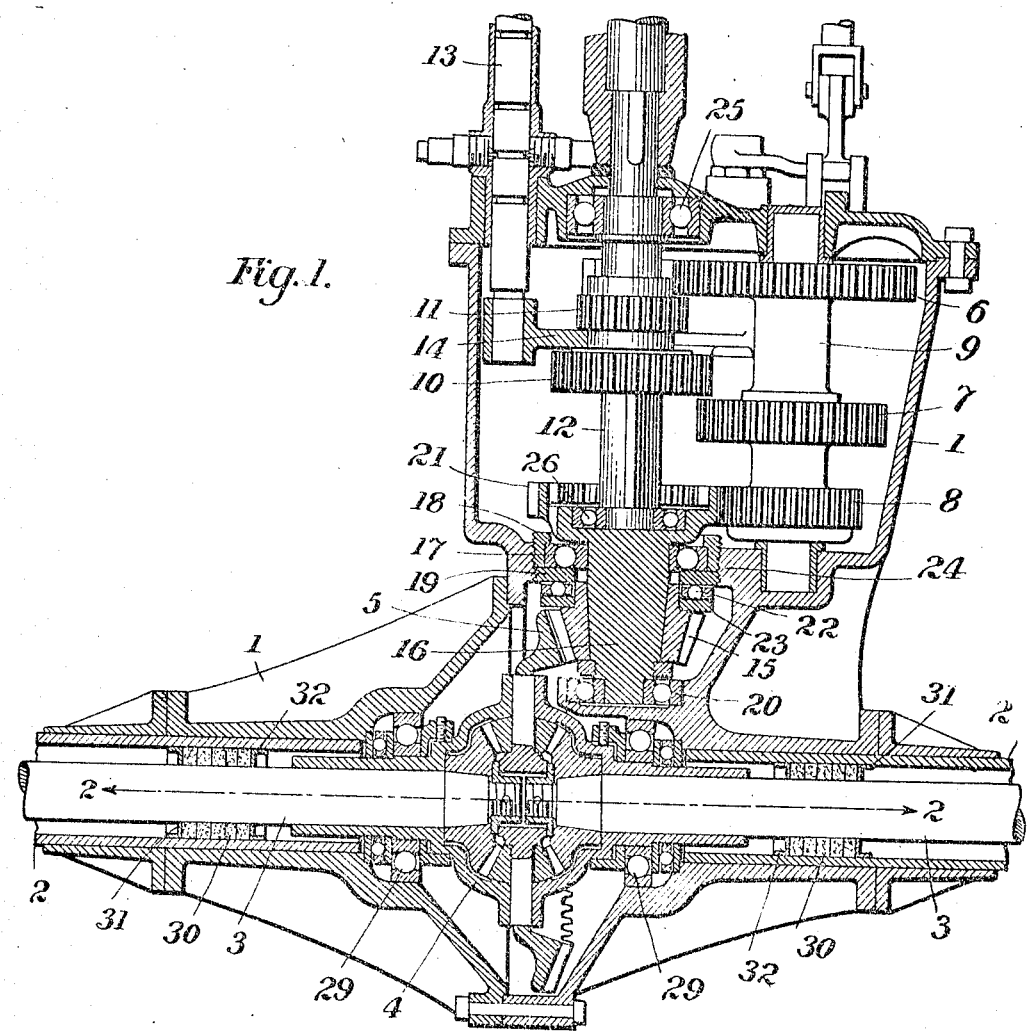
Figure 2:
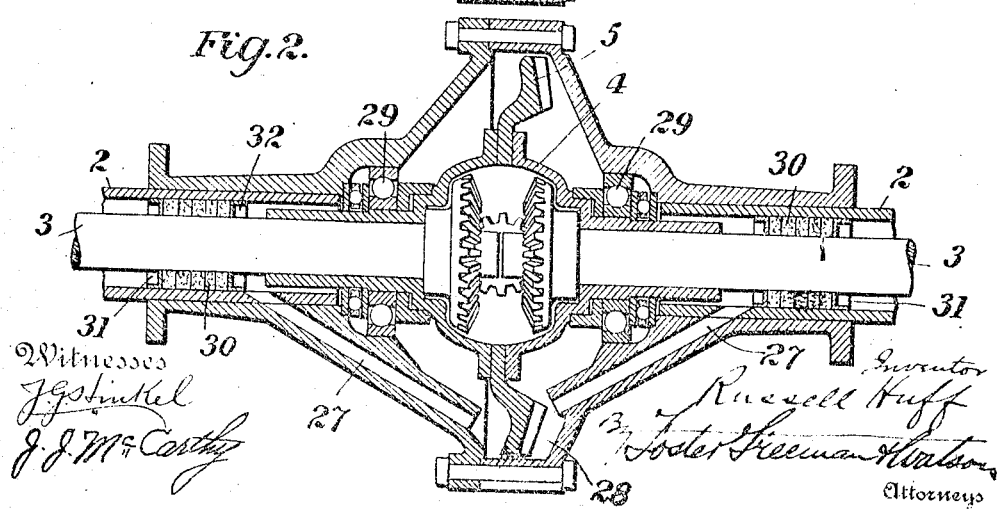

The object of the present invention is to improve the construction and arrangement of transmission gearing for motor vehicles and more particularly transmission gearing arranged at and directly connected with the rear or driving axle. The invention will be described in connection with the accompanying drawing, in which, Figure 1 is a substantially horizontal section through the rear axle and the casing of the transmission gear; Fig. 2 is a vertical section on the line 2—2 of Fig. 1.

Referring to the drawings, 1 indicates a gear case, 2 the rear axle casings which are rigidly connected with the gear case, 3 the sections of the rear axle, 4 the housing of the differential gears and 5 the gear surrounding and connected to the said housing and which drives the same. The differential gears may be of any approved construction, it being understood that they are connected to the two axle sections 3 in some suitable manner.

The change speed gearing comprises gears 6, 7, and 8, fixed on a counter-shaft 9, and gears 10 and 11 arranged to slide on and turn with a drive shaft 12, the gear 11 being adapted to coöperate with the gear 6 and the gear 10 adapted to coöperate with the gear 7. The gears 10 and 11 are preferably connected together by a common hub or sleeve and are adapted to be shifted longitudinally on the shaft 12 by a rod 13 and a yoke 14.

The gear 5 which turns the differential housing is driven by a beveled gear 15 carried by a short shaft 16 which is mounted in a ball bearing 17, the outer ring of the ball bearing being seated in a ring 18 which is adjustably threaded into the casing 1 and adapted to be held in any desired position by a threaded ring 19 which serves as a lock nut. At its rear end the shaft 16 is carried in a ball bearing 20 mounted in the casing 1 and at its front end it carries a clutch gear 21 which is provided with external teeth in mesh with the gear 8 of the counter-shaft and with internal teeth adapted to intermesh with the gear 10 of the drive shaft. When the gears 10 or 11 intermesh with one of the gears of the counter-shaft, the differential is driven by means of the gears 8 and 21. When however the gear 10 intermeshes with the gear 21, the differential is driven directly from the drive shaft 12 and the counter-shaft runs idle, the gears 10 and 21 forming a clutch for direct connection.

A thrust bearing 22 is interposed between the pinion 15 and the ring 19, the said bearing comprising a ring 23 fixed on the pinion and a series of balls between the ring 23 and the ring 19. The supporting rings 18 and 19 for the bearing 17 are preferably mounted in a flange 24 of the casing, which flange and bearing form a partition dividing the change speed gear compartment from the differential compartment of the casing. The shaft 16 extends through said partition and carries the gear 21 in one compartment and the gear 15 in the other. The drive shaft 12 has a bearing 25 in the forward end of the casing 1 and its rear or free end is journaled in a suitable ball bearing 26 in the forward end of the shaft 16 adjacent to the clutch gear 21. The threaded rings 18 and 19 permit of adjusting the shaft 16 lengthwise to some degree to adjust the mesh of the beveled gears 5 and 15 accurately.

The casing 1 is provided with passages or ducts 27 leading from the interior of the axle casings 2 to the lower part 28 of the casing. The gears in the casing run in oil which oil is carried up from the bottom 28 to the top of the casing and part of it finds its way through the bearings 29 of the differential housing into the space between the axle sections and their casings. This oil is prevented from passing outward through the said space to the wheel hubs by packing material 30 which is interposed between the axle sections and their casings and held in place by cups or rings 31, 32 which are pressed into the axle casings and have flanges engaging the axle casings frictionally. The packing material 30 is outside of the upper ends of the ducts 27 and the oil which circulates through the bearings into the axle casings returns by said ducts to the lower part of the gear case. The oil is thus circulated through the axle bearings and the bearings of the shaft 16 are likewise lubricated by oil carried up by the gear 5.

Having described my invention what I claim and desire to secure by Letters-Patent, is, 1. In transmission gearing for motor vehicles, the combination with the change speed gearing, the differential gearing and a casing inclosing said gearings, of a drive shaft, and a shaft interposed between the drive shaft and the differential gearing, a clutch gear on one end of said interposed shaft coöperating with the change speed gearing, and a beveled gear upon the opposite end thereof coöperating with the differential gearing, a radial bearing for said interposed shaft adjustably mounted in the casing, and a thrust bearing for said shaft also adjustably mounted in the casing, one of said bearings serving as a lock for the other.

2. In transmission gearing for motor vehicles, the combination of rear axle casings, an intermediate casing, differential gearing in said intermediate casing, and packing material arranged in said rear axle casings on opposite sides of the differential gearing, said casings having conduits leading from the interior of the axle casings to the lower part of the casing containing the differential gearing.

3. In transmission gearing for motor vehicles, the combination with rear axle sections, intermediate differential gearing, a housing for said differential gearing, means for turning said housing, ball bearings for said housing, and casings surrounding said differential gearing and said axle sections, of packing material arranged in said casings surrounding the axle sections, said casings having conduits leading from the space surrounding the axles to the lower part of the casing surrounding the differential gearing.

4. In transmission gearing for motor vehicles, the combination with rear axle sections and intermediate differential gearing, of a casing surrounding said axle sections and gearing, and supporting the differential gearing on bearings therein, and packing material in said casing and surrounding the axle sections, said casing having conduits leading from points contiguous to said packing to the lower part of the casing.

In testimony whereof I affix my signature in presence of two witnesses.

RUSSELL HUFF.

Witnesses:
ALLEN LOOMIS,
DANIEL HUFF.